United States Patent [19]

Hachiro

[11] Patent Number: 4,628,691
[45] Date of Patent: * Dec. 16, 1986

[54] TANDEM TYPE MASTER CYLINDER

[75] Inventor: Nobuaki Hachiro, Ueda, Japan

[73] Assignee: Nissin Kogyo Kabushiki Kaisha, Ueda, Japan

[*] Notice: The portion of the term of this patent subsequent to Feb. 19, 2002 has been disclaimed.

[21] Appl. No.: 623,333

[22] Filed: Jun. 21, 1984

Related U.S. Application Data

[62] Division of Ser. No. 211,430, Nov. 28, 1980, abandoned.

[30] Foreign Application Priority Data

Dec. 8, 1979 [JP] Japan .................................. 54-159511
Dec. 18, 1979 [JP] Japan .................................. 54-164597

[51] Int. Cl.$^4$ ............................................. B60T 11/20
[52] U.S. Cl. ........................................ 60/562; 60/588; 60/592
[58] Field of Search ...................... 60/547.1, 562, 585, 60/588, 592, 584

[56] References Cited

U.S. PATENT DOCUMENTS

| | | | |
|---|---|---|---|
| 2,844,940 | 7/1958 | Huber | 60/588 |
| 3,013,393 | 12/1961 | Erickson | 60/592 |
| 3,545,206 | 12/1970 | Belart | 60/588 |
| 4,004,425 | 1/1977 | Pickering | 60/562 |
| 4,072,012 | 2/1978 | Kawakami | 60/588 |
| 4,133,287 | 1/1979 | Downs | 60/592 |
| 4,166,431 | 9/1979 | Pickering | 60/585 |
| 4,168,613 | 9/1979 | Nakagawa | 60/588 |
| 4,191,020 | 3/1980 | Krohn | 60/562 |
| 4,347,779 | 9/1982 | Belart | 60/588 |
| 4,499,730 | 2/1985 | Kasahara | 60/588 |

FOREIGN PATENT DOCUMENTS

| | | | |
|---|---|---|---|
| 2615986 | 10/1976 | Fed. Rep. of Germany | 60/585 |
| 900327 | 7/1962 | United Kingdom | 60/588 |
| 979418 | 1/1965 | United Kingdom | 60/547.1 |

Primary Examiner—Abraham Hershkovitz
Attorney, Agent, or Firm—Roberts, Spiecens & Cohen

[57] ABSTRACT

A tandem master cylinder for an automobile disclosed herein includes a cylinder body having a cylinder bore, a first and a second pistons slidable in the cylinder bore and axially apart from each other, a first and a second power chambers defined, independently from each other, in the cylinder bore by the first and second pistons, and an auxiliary reservoir formed integrally with the cylinder body at its upper side adjacent the first power chamber. The auxiliary reservoir has a first and second reservoir chambers separated from each other by a partition and both connected with a main reservoir. The first power chamber is connected with the first reservoir chamber through a pair of first vent and supply ports. The second power chamber is connected with the second reservoir chamber through an oil passage which is formed in the cylinder body and which uprises in the direction from the latter to the former.

9 Claims, 4 Drawing Figures

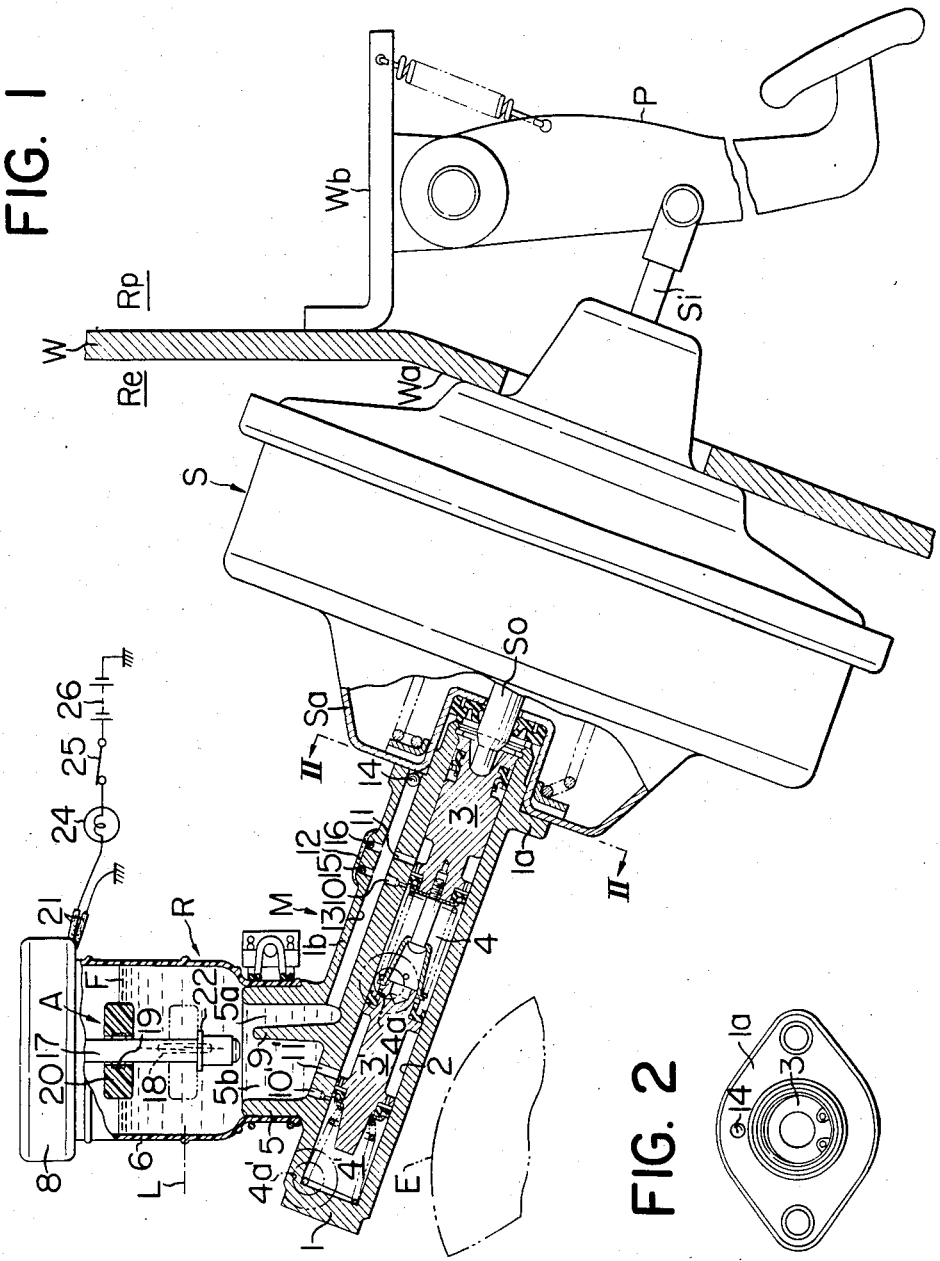

TANDEM TYPE MASTER CYLINDER

This is a divisional on, application Ser. No. 211,430, now abandoned filed 11/28/80.

BACKGROUND OF THE INVENTION

1. Field of the Invention

The present invention relates primarily to a tandem type master cylinder used for a dual hydraulic brake system in automobiles, and more particularly, to a tandem type master cylinder having a cylinder body provided with a single oil tank.

2. Description of the Prior Art

In a master cylinder of the type as described and heretofore known, a cylinder body has a cylinder bore in which are defined a pair of independent first and second hydraulic power chambers by means of a pair of front and rear pistons slidably received in the cylinder bore. The cylinder body is formed at its upper side with an auxiliary oil reservoir having first and second reservoir chambers defined by a partition and placed in communication with the first and second hydraulic power chambers, respectively, the auxiliary oil reservoir being formed at its upper end with a main oil reservoir in communication with both the reservoir chambers. This conventional master cylinder is advantageous in that a single supply of oil into the oil reservoir will suffice and hence replenishment of oil is simple; only one set of oil detectors need be provided on the main oil reservoir; and even if oil leakage should occur in either one of the two hydraulic circuits in communication with the first and second hydraulic power chambers, the other normal circuit is prevented from being evacuated. On the other hand, the aforementioned prior art master cylinder suffers from the disadvantages in that since the auxiliary oil reservoir is provided at one point on the cylinder body, a communicating oil passage connecting the auxiliary oil reservoir and one of the hydraulic power chambers remote therefrom inevitably becomes lengthened, and therefore, bubbles generated in the oil tend to stay in the oil passage.

SUMMARY OF THE INVENTION

It is therefore an object of the present invention to provide the aforesaid master cylinder with improvements which remove those disadvantages noted above without impairing the aforementioned advantages.

According to one aspect of the present invention, there is provided a tandem type master cylinder for an automobile comprising: a cylinder body mounted on a front wall of a compartment of an automobile in an inclined relation to the horizontal, said cylinder body having a cylinder bore formed therein; first and second pistons slidable in said cylinder bore and disposed axially apart from each other; first and second hydraulic power chambers defined, independently from each other, in said cylinder bore by means of said first and second pistons, said first power chamber being at a position higher than said second power chamber; an auxiliary oil reservoir formed integrally with said cylinder body at its upper side adjacent said first power chamber, said auxiliary reservoir having first and second reservoir chambers defined by a partition, said first reservoir chamber being in communication with said first power chamber through a first vent port and a first supply port; an oil passage formed in said cylinder body connecting said second reservoir chamber and said second power chamber through a second vent port and a second supply port; and a main oil reservoir formed adjacent said auxiliary reservoir and being in communication with said first and second reservoir chambers.

According to another aspect of the present invention, there is provided a tandem type master cylinder comprising: a cylinder body mounted on a front wall of a compartment of an automobile, said cylinder body having a cylinder bore formed therein; first and second pistons slidable in said cylinder bore and disposed axially apart from each other; first and second hydraulic power chambers defined, independently from each other, in said cylinder bore by means of said first and second pistons; an auxiliary oil reservoir formed integrally with said cylinder body at its upper side adjacent said first power chamber, said auxiliary reservoir having first and second reservoir chambers defined by a partition, said first reservoir chamber being in communication with said first power chamber through a first vent port and a first supply port; an oil passage connecting said second reservoir chamber and said second power chamber through a second vent port and a second supply port, said oil passage extending upwardly in a direction from said second port to said second reservoir chamber; and a main oil reservoir connected with said auxiliary reservoir and being in communication with said first and second reservoir chambers.

BRIEF DESCRIPTION OF THE DRAWINGS

FIG. 1 is a longitudinal sectional side view showing a principal part of a first embodiment in accordance with the present invention;

FIG. 2 is a view taken along line II—II IN FIG. 1;

DESCRIPTION OF THE PREFERRED EMBODIMENTS

Figure 3:
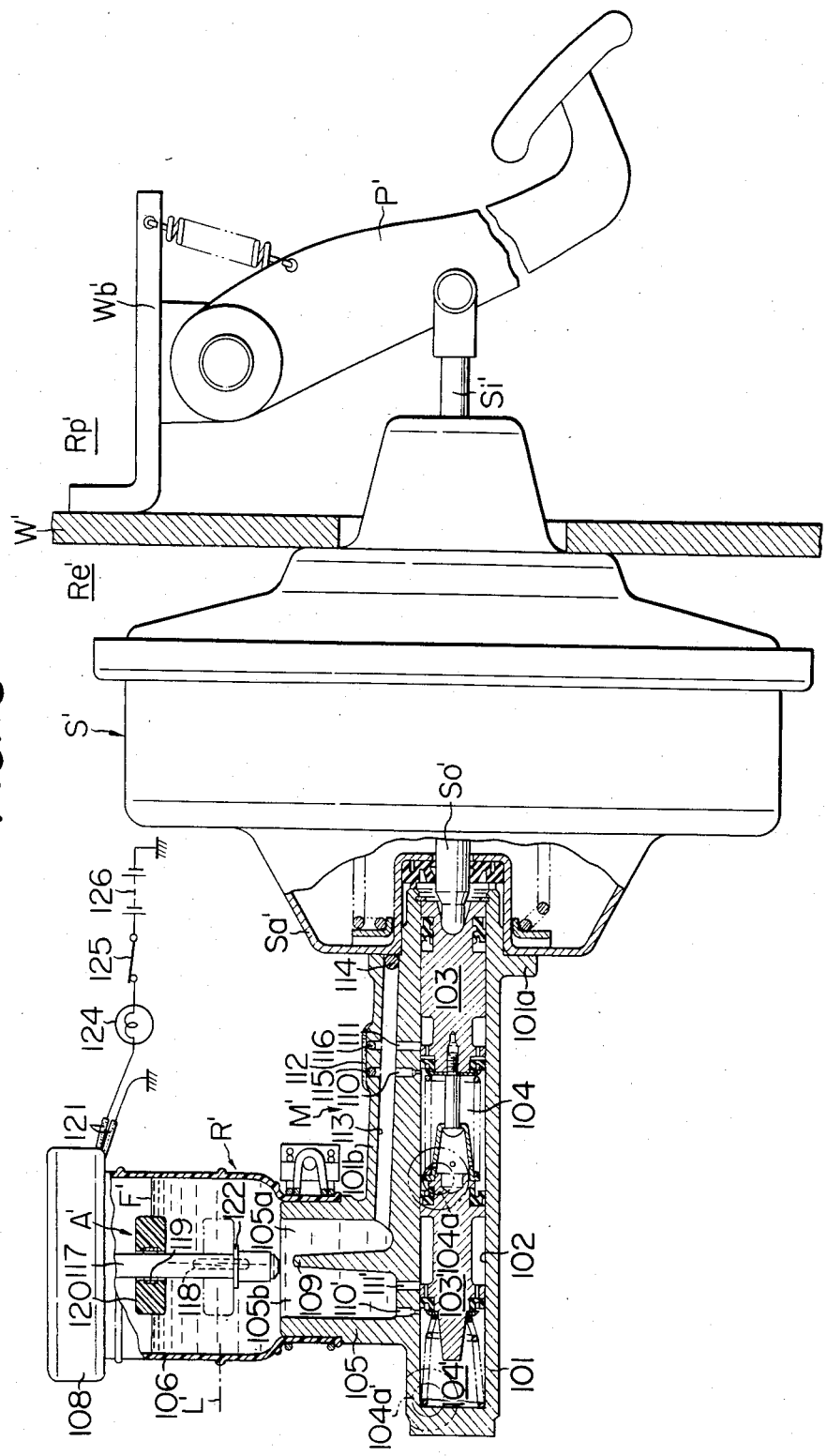
FIG. 3 is a longitudinal sectional side view showing a principal part of a second embodiment in accordance with the present invention.

A first embodiment of the present invention, which is applied to the operation of a dual hydraulic brake system in an automobile, will be explained hereinafter with reference to the drawings.

The reference character W designates a front wall of a compartment which serves as a partition between a compartment Rp of an automobile and an engine chamber or room Re disposed frontwardly thereof. The front wall W is formed at its front surface with an upwardly inclined mounting surface Wa, on which a booster shell Sa of a booster device S is mounted perpendicularly thereto by means of bolts (not shown), and a cylinder body 1 of a tandem type master cylinder M is also mounted on the front surface of the booster shell similarly perpendicularly thereto by means of bolts, whereby the cylinder body 1 may be maintained in a frontwardly raised inclined posture in the engine room Re. Reference character 1a designates a flange to connect the rear end of the cylinder body 1 with the booster shell Sa.

In this manner, the cylinder body 1 is inclined so that an oil passage 13 which provides communication between an auxiliary oil reservoir 5 and a hydraulic power chamber 4 disposed remotely therefrom, which will be described later is upwardly inclined towards the auxiliary oil reservoir 5. In the present invention, the inclination direction of the cylinder body 1 may be either frontwardly or rearwardly raised, but the frontwardly raised inclination as in the illustrated embodiment is effective for enlarging the space used to install therein the engine E in the engine room Re.

Furthermore, when the mounting surface Wa of the front wall W of a compartment is inclined in order to incline the cylinder body 1, the rear end thereof can be formed perpendicularly to an axis of the cylinder body 1 as has been done in the prior art. Therefore, this arrangement is advantageous to manufacture the cylinder body 1 and to minimize the overall length of the cylinder body 1.

A bracket Wb is extended from the rear surface of the front wall W, and a brake pedal P for operating an input rod Si of the booster device S is journalled thereon.

A rear first hydraulic power chamber 4 and a front second hydraulic power chamber 4' are disposed independently of each other and are defined in a cylinder bore 2 of the cylinder body 1 by means of a pair of front and rear first and second pistons 3, 3' placed in sliding contact with the bore 2, and dual type brake hydraulic circuits are individually connected to output ports 4a, 4a' of these hydraulic power chambers 4, 4', respectively, said rear first piston 3 having an output rod So of the booster device S connected thereto.

An oil tank R is disposed above the cylinder body 1. This oil tank R comprises a cylindrical auxiliary oil reservoir 5 integrally extended adjacent to the hydraulic power chamber at a higher level on the upper side of the cylinder body 1, that is, adjacent to the second hydraulic power chamber 4' in the illustrated embodiment, and a transparent main oil reservoir 6 formed of synthetic resin whose lower end is fittedly connected to the outer periphery of the auxiliary oil reservoir 5, said main oil reservoir 6 having a greater volume than the auxiliary oil reservoir 5 and being provided at its upper end with a single cap 8.

The interior of the auxiliary oil reservoir 5 is divided into a rear first oil reservoir chamber 5a and a front second oil reservoir chamber 5b by means of a partition 9 integral with the cylinder body 1, both the oil reservoir chambers 5a and 5b being communicated with the main oil reservoir 6. Thus, the second oil reservoir chamber 5b is disposed in the vicinity of the front end of the front second piston 3' and has a vent port 10' and a supply port 11' of the second hydraulic powe chamber 4' bored in the bottom wall thereof.

On the other hand, at the rear of the auxiliary oil reservoir 5 there extends a thick side wall 1b of the cylinder body 1, said side wall 1b having an oil passage 13 bored therein to bring the first oil reservoir chamber 5a into communication with a vent port 10 and a supply port 11 of the first hydraulic power chamber 4, and the oil passage 13 is upwardly inclined towards the auxiliary oil reservoir 5.

The oil passage 13 is bored by means of a drill from the end of a connecting flange 1a of the cylinder body 1, the thus bored passage being closed by a spherical blind plug 14, and the booster shell Sa in contact with the connecting flange 1a is so arranged as to prevent slip-out of the blind plug 14. Further, the vent port 10 and the supply port 11 are bored by means of a drill from the outer surface of the thick side wall 1b, the thus bored ports being also closed by spherical blind plugs 15 and 16, respectively, covered by adhesive 12 for the purpose of preventing the blind plugs 15 and 16 from being removed and for achieving a seal.

It should be noted in the present invention that the cylinder body 1 may be mounted on the front wall W directly without interposition of the booster device S. In addition, the auxiliary oil reservoir 5 may be sometimes disposed at the rear of the cylinder body 1, that is, adjacent to the first hydraulic power chamber 4, and in this case, the vent port 10' and supply port 11' of the second hydraulic power chamber 4' are brought into communication with the second reservoir chamber 5b through an inclined oil passage formed in a manner similar to oil passage 13.

When the brake pedal P is depressed to actuate the booster device S so that the output rod So thereof causes the first and second pistons 3, 3' to be urged frontwardly (leftwards in the figure), the vent ports 10 and 10' are closed by the pistons 3 and 3', respectively, and oil pressures generated in the hydraulic power chambers 4, 4' may be respectively transmitted to the brake hydraulic circuits to actuate the respective brakes. At the retraction of the first and second pistons 3, 3', supply of working oil to the first and second hydraulic power chambers 4, 4' is effected from the first and second reservoir chambers 5a, 5b through the supply ports 11, 11', and surplus oil can be returned from the vent ports 10, 10' towards the first and second reservoir chambers 5a, 5b, whose function is the same as in the prior art.

The main oil reservoir 6 is provided with an oil level detector A which operates when the level F of working oil stored therein drops below a predetermined level L. This detector A comprises a switch cylinder 17 projected from the undersurface of the cap 8 and extending deep into the main oil reservoir 6, a magnetic sensitive lead switch 18 accommodated within the switch cylinder 17 and located at the predetermined level L, and an annular float 20 vertically movably fitted in the outer periphery of the switch cylinder 17 and having a magnet 19, which can close the lead switch 18, embedded internally thereof, said lead switch 18 having an alarm 24 such as a lamp, a main switch 25 and a power source 26 successively connected thereto through a lead wire 21 in said order, said alarm 24 being disposed on the front surface of a driver's seat of a vehicle, said main switch 25 being opened and closed in response to opening and closing of the engine switch of the vehicle. The switch cylinder 17 is provided at its lower end with a stopper 22 which can control the lowering of the float 20 to a level below the neighborhood of the predetermined level L.

During the operation of the vehicle, and thus, with the main switch 25 closed, and when a suitable quantity of working oil is stored in the main oil reservoir 6, the level F being positioned at a level higher than the predetermined level L, the float 20 floating on the level F is upwardly away from the lead switch 18 as indicated in the solid lines and therefore, the lead switch 18 is maintained in open state without being affected by the magnetic force of the magnet 19 of the float 20. Accordingly, the alarm 24 connected to the lead wire 21 will not be actuated.

However, if oil leakage should occur in the hydraulic circuit in the system of the first hydraulic power chamber 4, the working oil remains stored within the second reservoir chamber 5b of the auxiliary oil reservoir 5 even if the working oil within the main oil reservoir 6 and the first reservoir chamber 5a of the auxiliary oil reservoir 5 is dissipated, and therefore, upon braking, both the pistons 3 and 3' are moved to boost the second hydraulic power chamber 4' so that the hydraulic circuit in that system may be operated normally.

Also, in this case, at the time the level F of the main oil reservoir 6 lowers to a predetermined level L, the float 20 is moved down along the switch cylinder 17 to a position as indicated by the dash-dotted contour lines so that the magnet 19 comes close to the lead switch 18 to close it, whereby the alarm 24 is immediately energized by the power source 26 to give alarm of abnormal lowering of the level F to the vehicle's operator. Even if the level F is further lowered, the float 20 is engaged by the stopper 22 and held in the vicinity of the predetermined level L. Therefore, the lead switch 18 may be maintained in its closed state, that is, the alarm state is maintained.

In the event the hydraulic circuit in the system of the second hydraulic power chamber 4' is in trouble, the action similar to the foregoing occurs with the exception that the working oil remains in the first oil reservoir chamber 5a of the auxiliary oil reservoir 5.

Figure 4:
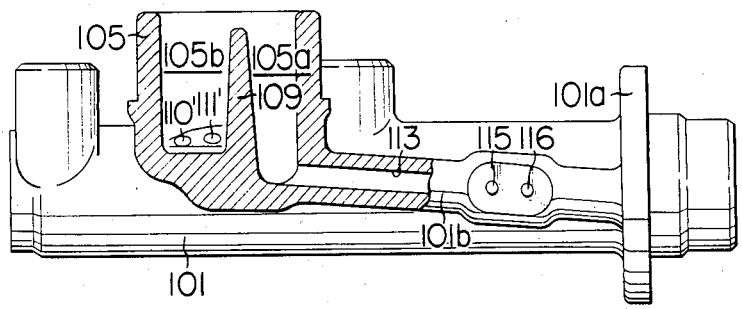
FIG. 4 is a side view with a principal part of the cylinder body shown in FIG. 3 cutaway.

FIGS. 3 and 4 illustrate a second embodiment of the present invention, in which those elements which correspond to those shown in the first embodiment bear the same reference numerals with 100 added thereto and the same reference characters with primes added thereto.

In this embodiment, the booster device S' is mounted vertically on the front wall W' of a compartment, the booster S' being mounted on the front wall W' with the cylinder body 101 of the master cylinder M' positioned substantially horizontally, and the oil passage 113 for bringing the first reservoir chamber 105a into communication with the vent port 110 and supply port 111 of the first hydraulic power chamber 104 is disposed on one lateral side of the cylinder body 101 while being upwardly inclined towards the auxiliary oil reservoir 105. With this arrangement, it is possible to minimize variation in wall thickness of the thick side wall 101b formed with inclined oil passage 113, and therefore, the cylinder body 101 may be advantageously cast. Other constructions and operations of this embodiment are substantially similar to the first embodiment.

As described above, in accordance with the present invention, the a auxiliary oil reservoir having the first and second reservoir chambers is integrally formed adjacent to one hydraulic power chamber on the upper side of the cylinder chamber, the vent port and supply port of the latter hydraulic power chamber is open to one of said reservoir chambers, and the other of said reservoir chambers is placed in communication with the a vent port and supply port of the other hydraulic power chamber through the oil passage which is upwardly inclined towards the auxiliary oil reservoir. With this arrangement, even if bubbles are generated due to vibrations, heating or the like in the oil in said relatively long oil passage, it is possible to immediately guide and remove said bubbles along the inclined inner surface of said oil passage towards the auxiliary oil reservoir thereby to prevent the bubbles from being sucked into the hydraulic power chamber, thus assuring normal operation of the master cylinder.

Furthermore, since the main oil reservoir in communication with the first and second reservoir chambers is disposed adjacent to an auxiliary oil reservoir, a single supply of oil to both the oil reservoirs will suffice to make replenishment of oil simple, and in addition, where the oil level detector is provided therein, only one thereof will suffice and thus, the original advantages are not impaired.

What is claimed is:

1. A tandem type master cylinder for a dual hydraulic brake system of an automobile comprising: a cylinder body mounted on a front wall of a compartment of an automobile, said cylinder body having a cylinder bore therein, first and second pistons slidable in said cylinder bore and disposed axially apart from each other to define front-side first and rear-side second hydraulic power chambers, independently from each other, in said cylinder bore; an auxiliary oil reservoir formed integrally with said cylinder body to extend substantially vertically upwards from an upper side of the cylinder body adjacent said front-side first power chamber, said auxiliary reservoir including a partition defining first and second reservoir chambers therein, said first reservoir chamber being in communication with said first power chamber through a first vent port and a first supply port provided in said cylinder body; said cylinder body having a side wall with an oil passage therein connecting said second reservoir chamber and said second power chamber via a second vent port and a second supply port provided in said side wall of the cylinder body; and a main oil reservoir adjacent said auxiliary reservoir and in communication with said first and second reservoir chambers, said front wall of said compartment having a mounting surface to which said cylinder body is secured, said cylinder body extending substantially horizontally in an engine compartment forwardly of the front wall of said compartment, said cylinder body having a rear end, said oil passage being constituted by a bore in said body extending from said second reservoir chamber to said rear end of said cylinder body in a forwardly, upwardly inclined relation, said oil passage being open at said rear end of said cylinder body, a plug closing the open end of said oil passage, said second supply and vent ports being constituted by bores formed from the outside in said body extending at an angle of intersection with respect to said oil passage, said oil passage having its open end positioned at one lateral side part of the rear end of said cylinder body and leading to a bottom of the second reservoir chamber.

2. A tandem type master cylinder for an automobile as claimed in claim 1 wherein said cylinder body is secured to said mounting surface through a servo-booster.

3. A tandem type master cylinder for an automobile as claimed in claim 2 comprising a supporting member supporting said master cylinder, said rear end of said cylinder body being in abutting engagement with said supporting member.

4. A tandem type master cylinder for an automobile as claimed in claim 3 wherein said supporting member comprises a servo-booster.

5. A tandem type master cylinder for an automobile as claimed in claim 1 eherein said oil passage has an open front end which directly opens into said second reservoir chamber.

6. A tandem type master cylinder for an automobile as claimed in claim 1 wherein said partition extends upwardly in said auxiliary chamber to a level above said passage.

7. A tandem type master cylinder for an automobile as claimed in claim 1 wherein said front wall extends substantially vertically.

8. A tandem type master cylinder for an automobile as claimed in claim 1 wherein said second supply and vent ports extend radially in said body.

9. A tandem type master cylinder for an automobile as claimed in claim 1 wherein said second supply and vent ports directly intersect and communicate with said oil passage.

* * * * *